US007673532B2

(12) United States Patent
Wilmer

(10) Patent No.: US 7,673,532 B2
(45) Date of Patent: Mar. 9, 2010

(54) PIPETTING DEVICE

(75) Inventor: Jens Wilmer, Ahrensburg (DE)

(73) Assignee: Eppendael AG, Hamburg (DE)

(*) Notice: Subject to any disclaimer, the term of this patent is extended or adjusted under 35 U.S.C. 154(b) by 0 days.

(21) Appl. No.: 11/764,428

(22) Filed: Jun. 18, 2007

(65) Prior Publication Data

US 2008/0006100 A1 Jan. 10, 2008

(30) Foreign Application Priority Data

Jul. 7, 2006 (DE) ...................... 10 2006 031 460

(51) Int. Cl.
*G01N 1/22* (2006.01)

(52) U.S. Cl. ................................ 73/864.16; 73/864.13

(58) Field of Classification Search ............. 73/864.16, 73/864.17

See application file for complete search history.

(56) References Cited

U.S. PATENT DOCUMENTS

| | | | | |
|---|---|---|---|---|
| 3,855,868 | A * | 12/1974 | Sudvaniemi | 73/863.32 |
| 4,041,764 | A | 8/1977 | Sabloewski et al. | |
| 4,258,761 | A | 3/1981 | Bennett, Jr. | 141/242 |
| 6,499,363 | B1 * | 12/2002 | Morimoto et al. | 73/864.01 |

FOREIGN PATENT DOCUMENTS

| | | | |
|---|---|---|---|
| DE | 260 571 | A1 | 4/1913 |
| DE | 23 04 473 | C2 | 1/1983 |
| DE | 23 66 505 | C2 | 12/1985 |
| DE | 239539 | A1 | 10/1986 |
| DE | 260571 | | 9/1988 |
| DE | 19708151 | A1 | 9/1998 |
| EP | 0181957 | A | 5/1986 |
| FR | 2330456 | A1 | 6/1977 |
| WO | 02/40162 | A1 | 5/2002 |
| WO | 02/089983 | A1 | 11/2002 |

* cited by examiner

*Primary Examiner*—Hezron Williams
*Assistant Examiner*—Mark Shabman
(74) *Attorney, Agent, or Firm*—Vidas, Arrett & Steinkraus, P.A.

(57) ABSTRACT

Pipetting device for metering liquids comprising a piston actuating rod, at least one receiver for a piston head arranged on one end of the piston actuating rod and which is defined by an abutment surface for the piston head in the axial direction of the piston actuating rod, and comprises a through-opening for a piston rod opposing said piston head and a base for supporting the piston head surrounding the through-opening, at least one cylinder with a hollow space, at least one seat for holding a pipette tip, at least one through-channel connecting the hollow space of a cylinder to a through-hole in a seat and at least one piston arranged longitudinally displaceably in a cylinder with a piston rod extending through the through-opening of a receiver and a piston head at the end of the piston rod arranged in the receiver, which is positioned on the base with a lower face facing the piston rod and comprises a resilient body projecting beyond the upper face facing away from the piston rod, which does not bear against the abutment surface in an elastically compressed manner or bears against the abutment surface in a partially elastically compressed manner.

24 Claims, 2 Drawing Sheets

PIPETTING DEVICE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a pipetting device for metering liquids.

Pipetting devices are used in laboratories for metering liquids. Air cushion pipettes have at least one integrated displacement unit comprising a cylinder and a piston arranged longitudinally displaceably therein. The hollow space of the cylinder is connected via a connecting channel to a through-hole in a seat for a pipette tip. By displacing the piston in the cylinder an air column may be displaced, in order to draw sample liquid into a pipette tip arranged sealingly on the seat and to eject sample liquid therefrom. In this connection, the displacement unit does not come into contact with the liquid. Only the pipette tip, which generally consists of plastics, is soiled and may be replaced after use,.

The piston is connected to a drive for displacing the piston within the cylinder. It is known to couple to the piston rod a piston actuating rod which may be driven manually or by means of an electromotive linear drive. The piston rod is inserted into a receiver of the piston actuating rod. Additionally, a spiral spring or helical spring is inserted into the receiver which rests against the piston spring in a pretensioned state, in order to avoid play.

The assembly cost for the known pipetting device is high, in particular because the exceptionally small spring is difficult to handle. This is also disadvantageous during use, for example when the user disassembles and reassembles the pipetting device for cleaning or autoclaving or for the replacement of faulty parts.

Proceeding therefrom, the object of the invention is to provide a pipetting device in which the assembly and disassembly of the piston actuating rod and displacement unit is associated with a lower cost.

BRIEF SUMMARY OF THE INVENTION

The pipetting device according to the invention for metering liquids comprises a piston actuating rod, at least one receiver for a piston head arranged on one end of the piston actuating rod and which is defined by an abutment surface for the piston head in the axial direction of the piston actuating rod, and comprises a through-opening for a piston rod opposing said piston head and a base for supporting the piston head surrounding the through-opening, at least one cylinder with a hollow space, at least one seat for holding a pipette tip, at least one through-channel connecting the hollow space of a cylinder to a through-hole in a seat and at least one piston arranged longitudinally displaceably in the hollow space of a cylinder with a piston rod extending through the through-opening of a receiver and a piston head at the end of the piston rod arranged in the receiver, which is positioned on the base with a lower face facing the piston rod and comprises a resilient body projecting beyond the upper face facing away from the piston rod, which does not bear against the abutment surface in an elastically compressed manner, or bears against the abutment surface in a partially elastically compressed manner.

In the pipetting device according to the invention, the piston has a resilient body which is not elastically compressed or which is partially elastically compressed for the purpose of compensating for play, when the piston head is arranged in the receiver. In this connection, the resilient body bears against the abutment surface of the receiver and the piston head is supported with the lower face on the base. The resilient body has a markedly greater elasticity than the piston and/or the piston head, on which the resilient body is arranged The resilient body is not a separate part but is arranged on the piston and, together with said piston and/or together with the displacement device, may be mounted on the piston actuating rod. In this connection, the handling of a separate, particularly small spring is dispensed with, so that the assembly cost and disassembly cost are reduced and assembly errors are avoided. So that the resilient body does not bear against the abutment surface in a elastically compressed manner or bears against the abutment surface in a partially elastically compressed manner, the overlap which the resilient body in the non-compressed state has over the lower face in the axial direction of the piston rod, is the same or greater than the distance of the base to the abutment surface.

The pipetting device according to the invention is, for example, a manual pipette or a pipetting device at a metering station or work station.

According to one embodiment, the pipetting device is a single-channel pipetting device, i.e. it comprises only one individual displacement unit which is connected to a single seat for a pipette tip.

According to a further embodiment, the pipetting device is a multi-channel pipetting device i.e. it comprises one or more displacement units which is/are connected to a plurality of seats for a plurality of pipette tips.

According to a further embodiment, the piston actuating rod comprises a cross-member aligned transversely to its longitudinal axis with a plurality of receivers for piston heads arranged adjacent to one another and a plurality of parallel cylinders with a plurality of pistons guided therein and arranged with their piston heads in the receivers. The reduction of the assembly and disassembly cost is particularly great in this multi-channel pipetting device with a plurality of displacement devices.

For the insertion of the piston head into the receivers different possibilities are considered. According to one embodiment, the piston head and through-opening have a cross-section which is formed such that the piston head may be inserted axially into the receiver in a specific rotary position relative to the through-opening and after a subsequent rotary motion (for example of 90°) is not able to be withdrawn, as it is positioned on the base. It is also possible to guide the piston in this secured rotary position between small projections, which project axially from the base and via which the piston head is only rotatable by pressing against the abutment surface and further axial compression of the resilient body, According to a further embodiment, the base is formed from a plate which may be releasably connected to the end of the piston actuating rod (for example by a thread on the periphery of a circular disc-shaped plate or by means of additional screws) in order to form the base with the through-opening of the receiver and/or to remove the base from the receiver.

According to one embodiment, the receiver has an insertion opening extending transversely to the piston actuating rod for the piston head and the piston rod. The piston may be easily inserted with the piston head and piston rod into the insertion opening and withdrawn therefrom When displacing the piston the force transmission is carried out perpendicular to the insertion opening, so that the piston does not slip out. In this connection, the piston may be secured by the partially compressed resilient body in the receiver. Moreover, the insertion opening for securing the piston may be covered by a removable housing part of the pipetting device.

Various embodiments of the piston head are possible, for example with a spherical, planar or conical lower face According to one embodiment, the piston head is supported by an annular disc on the base. According to a further embodiment, the piston head comprises a tapered portion between the annular disc and piston rod.

The resilient body may be fastened to the piston in different ways. The fastening may be carried out by a positive connection and/or frictional connection and/or material connection.

In a positive connection, for example, the resilient body has an external edge which externally engages around one edge of the piston head and in this manner is secured to the piston head. According to a further positive connection, the resilient body is attached by means of projecting elements to the lower face in corresponding recesses in the upper face of the piston head.

According to one embodiment, the piston on the upper face of the piston head comprises a blind hole, in which the resilient body is partially arranged. The resilient body is, for example, fixed by pressing in and/or by a frictional connection in the blind hole. According to one embodiment, the blind hole at a distance from its opening comprises a widened portion and the resilient body is positively fixed by engagement in the widened portion in the blind hole. According to one embodiment, the blind hole comprises widened portions diametrically opposing one another. According to a further embodiment, the radial widened portions extend from a recess at the bottom of the blind hole.

According to one embodiment, the resilient body comprises a spherical portion which projects from the piston head. The spherical portion promotes a gradual elastic deformation with a gradual increase in the resilient restoring forces.

According to one embodiment, the piston has a tapered portion on the end remote from the piston head and the cylinder and/or the connecting channel on the inside has a corresponding taper. This promotes complete emptying of the cylinder. Due to the resilient coupling of the piston and piston actuating rod, pressing in and/or clamping the tapered portion in the taper, is avoided.

The piston may be sealed in the cylinder in different ways. It is possible that it is sealed with an outer periphery directly on the inner periphery of the cylinder. According to one embodiment, the piston has at least one peripheral piston seal on the end remote from the piston head. The piston seal has a greater elasticity than the piston. A secure seal is achieved even when the piston and cylinder are not adjusted relative to one another with a high degree of precision.

According to one embodiment, the piston seal is a piston sealing ring inserted into an annular groove on the periphery of the piston.

The cylinder is, for example, connected to the seat via a small tube or a pipe. According to one embodiment, the cylinder is configured integrally with the seat, The seat is, for example, a receiver for inserting a pipette tip. The pipette tip is secured in the receiver by clamping its upper edge region. According to a further example, the seat is a cylindrical attachment on which a pipette tip may be mounted so that it is fixed by clamping onto the seat. According to one embodiment, the seat is a tapered portion for mounting a pipette tip.

The pipette tip may be sealingly fixed directly onto the seat. According to one embodiment, the seat has at least one peripheral seat seal for sealing against a mounted and/or inserted pipette tip. According to a further embodiment, the seat seal is a sealing ring inserted into a further annular groove on the periphery of the seat.

According to one embodiment, the resilient body and/or the piston seal and/or the seat seal comprises an elastomer i.e. consists completely or partially of the elastomer.

According to a further embodiment, the resilient body and/or the piston seal and/or the seat seal consists of silicone and/or of thermoplastic elastomer.

The resilient body and the piston are, for example, produced separately and subsequently connected to one another. According to one embodiment, the piston is produced from plastic, in particular by injection-moulding. According to one embodiment, the resilient body is injection-moulded onto the piston. By injection-moulding the resilient body onto the piston, the resilient body and piston may be connected to one another by a positive and/or frictional and/or material connection, the latter for example, if the materials have been selected such that they fuse together in the contact region. According to a further embodiment, the piston and the resilient body are produced in a multi-component injection-moulding method.

According to one embodiment, the pipetting device has a housing which encompasses the piston actuating rod, the at least one cylinder with the at least one piston and the at least one seat on one side of the housing accessible from the outside. The pipetting device is, for example, provided with a separate manual or electric drive device which is also arranged in the housing.

According to a further embodiment, the end of the piston actuating rod is also accessible from the outside on one side of the housing. The pipetting device thus forms a pipetting tool which may be connected to a drive device.

The drive device may, in turn, be a manually actuatable drive device or a drive device driven electromotively, According to one embodiment, the piston actuating rod projects from the side of the housing, in order to be coupled to a drive member of a drive device. To this end, according to one embodiment, an axially outwardly sprung piston actuating rod bears axially against a linear displaceable actuating member of the drive device. According to a further embodiment, the piston actuating rod comprises at the end remote from the receiver a coupling device for connecting to a drive device.

According to one embodiment, the housing comprises a fastening device for fastening the pipetting device to a drive device. The fastening device is, for example, a screw thread and/or a bayonet connection and/or a flange and/or radially projecting edge for fixing to pivotable gripping and/or clamping devices of the drive device.

BRIEF DESCRIPTION OF THE SEVERAL VIEWS OF THE DRAWINGS

The invention is described in more detail hereinafter with reference to the accompanying drawings of an embodiment, in which.

DETAILED DESCRIPTION OF THE INVENTION

Figure 1:
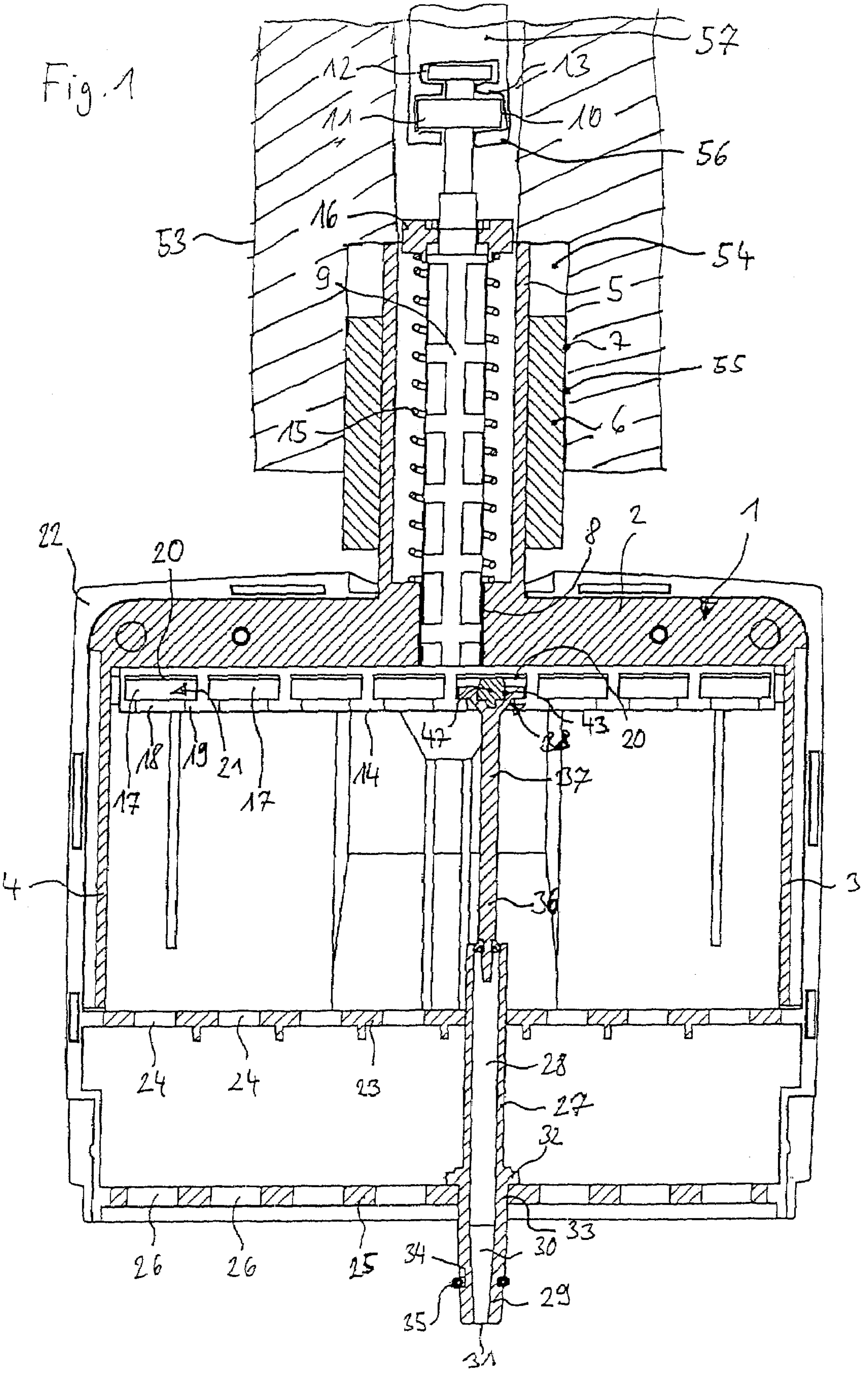
FIG. 1 shows a multi-channel pipetting device in a longitudinal section.

While this invention may be embodied in many different forms, there are described in detail herein a specific preferred embodiment of the invention. This description is an exemplification of the principles of the invention and is not intended to limit the invention to the particular embodiment illustrated According to FIG. 1, the pipetting device has a U-shaped basic structure 1, which comprises a base 2 and two aims 3, 4 projecting perpendicularly therefrom on the edge. A hollow cylindrical fastening device 5 projects outwardly from the base 2.

The basic structure 1 is, for example, produced from metal or from a rigid and solid plastic.

A fastening sleeve 6 with an external thread 7 is arranged externally on the fastening device 5, rotatable relative thereto and axially immovable. The fastening sleeve 6 is also produced from metal or a rigid and solid plastic.

A through-hole 8 extends coaxially to the fastening device 5 transversely through the base 2.

A piston actuating rod 9 extends coaxially through the fastening device 5 and through the through-hole 8. The piston actuating rod 9 has a coupling device 10 on one end projecting outwardly from the fastening device 5, for connecting to a drive device which comprises two peripheral circular disc-shaped shaft collars 11, 12 with a groove 13 therebetween.

The piston actuating rod 9 is connected on the inside of the base 2 to a cross-member 14 which is aligned transversely to the piston actuating rod 9.

In the fastening device 5 a helical spring 15 is arranged which is supported at one end on the outer face of the base 2 and at the other end on an abutment 16 in the form of a ring nut which is screwed onto the piston actuating rod 9 in the vicinity of an opening of the fastening device 5. The helical spring 15 is located in the position shown in a pretensioned state, so that it presses the cross-member 14 against the inside of the base 2.

The cross-member 14 has, on the side facing away from the base 2, a plurality of parallel receivers 17 for one respective piston head. Each receiver 17 is accessible from outside on the side facing away from the base 2 through a through-opening 18 in a base 19, The base 19 thus forms an edge defining the through-opening 18, which projects inwardly relative to the part of the receiver 17 located thereover.

Each receiver has an abutment surface 20, axially relative to the through-opening 18. Each receiver 17 is, moreover, accessible from outside through an insertion opening 21 extending perpendicular to the piston actuating rod 9 and to the cross-member 14 (and/or perpendicular to the drawing plane).

The piston actuating rod 9 and the cross-member 14 are, for example, produced from a metallic material or from a rigid and solid plastic.

A multipart housing 22 is fixed to the base structure 1, The housing 22 is relatively planar, i.e. its outer dimensions perpendicular to the drawing plane are only a fraction of the outer dimensions shown in the drawing plane.

In the housing 22 directly adjacent to the ends of the arms 3, 4 is a perforated plate 23 extending parallel to the base 2 with guide holes 24 extending in the axial direction of the piston actuating rod 9 and aligned with the through-holes 18.

At a further distance from the base 2 a further perforated plate 25 is arranged with threaded holes 26 coaxial relative to the guide holes 24. The further perforated plate 25 seals the housing 22 on said front face.

The housing 22 is produced from a rigid and solid plastic or from a metallic material.

Moreover, the pipetting device comprises a plurality of cylinders 27 with a cylindrical hollow space 28 which are connected integrally to a seat 29 in the form of a tapered portion for a pipette tip. The cylindrical hollow space 28 is connected via a tapered through-channel 30 to a through-hole 31 in a front face of the seat 29.

Each cylinder 27 has a peripheral flange 32. Moreover each cylinder 27 has, on the side of the seat 29 in the vicinity of the flange 32, an external thread 33. The cylinder 26 consists of a metallic material or from a rigid and solid plastic.

Each cylinder 27 is inserted into a guide bore 24 and screwed into a threaded bore 26 coaxial thereto, so that the flange 32 is positioned on the inside of the further perforated plate 25. Instead of which, the cylinder 27 may be designed without an external thread 33, and inserted into a threadless hole of the further perforated plate 25. A spring may hold the flange 32 in abutment against the further perforated plate 25. In this position, the seat 29 projects outwardly beyond the adjacent front face of the housing 22.

An annular groove 34 circulates around the periphery of the seat 29 and in which a seat sealing ring 35 is arranged.

All guide bores 24 and threaded bores 26 are equipped in the aforementioned manner with cylinders 27. In the drawings, only one individual cylinder 27 is shown for simplification.

A piston 36 is axially displaceably guided in each cylinder 27.

Each piston 36 has a piston head 38 at the end of a piston rod 37 projecting from the cylinder 27.

Figure 2:
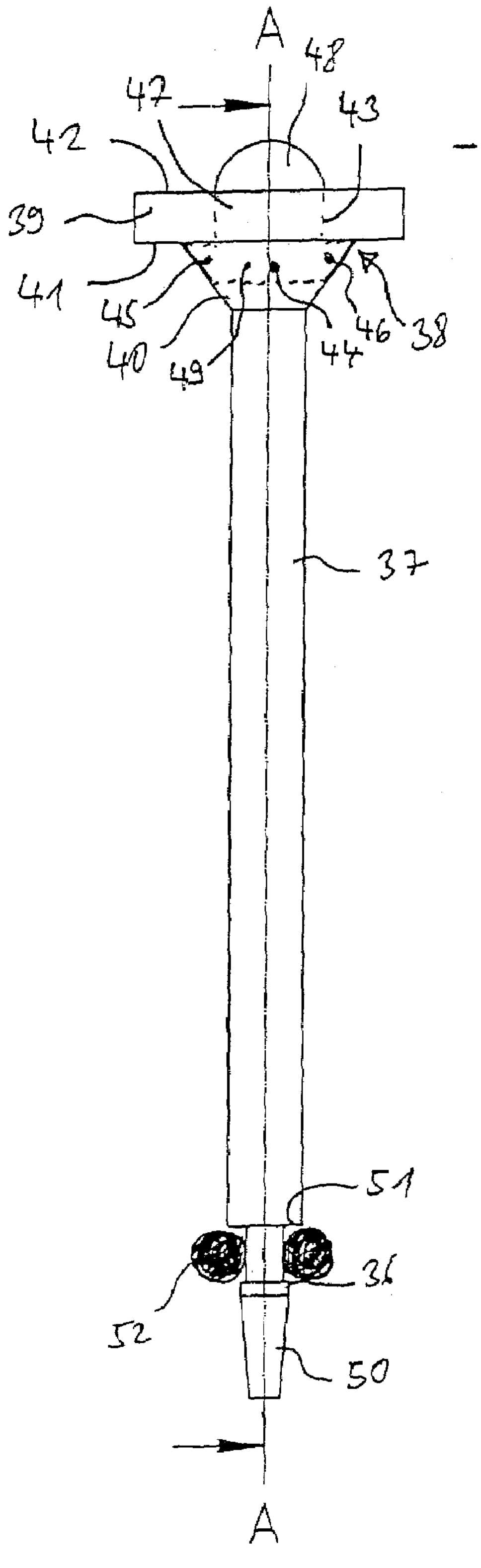
FIG. 2 shows the piston of said multi-channel metering device in an enlarged side view.
Figure 3:
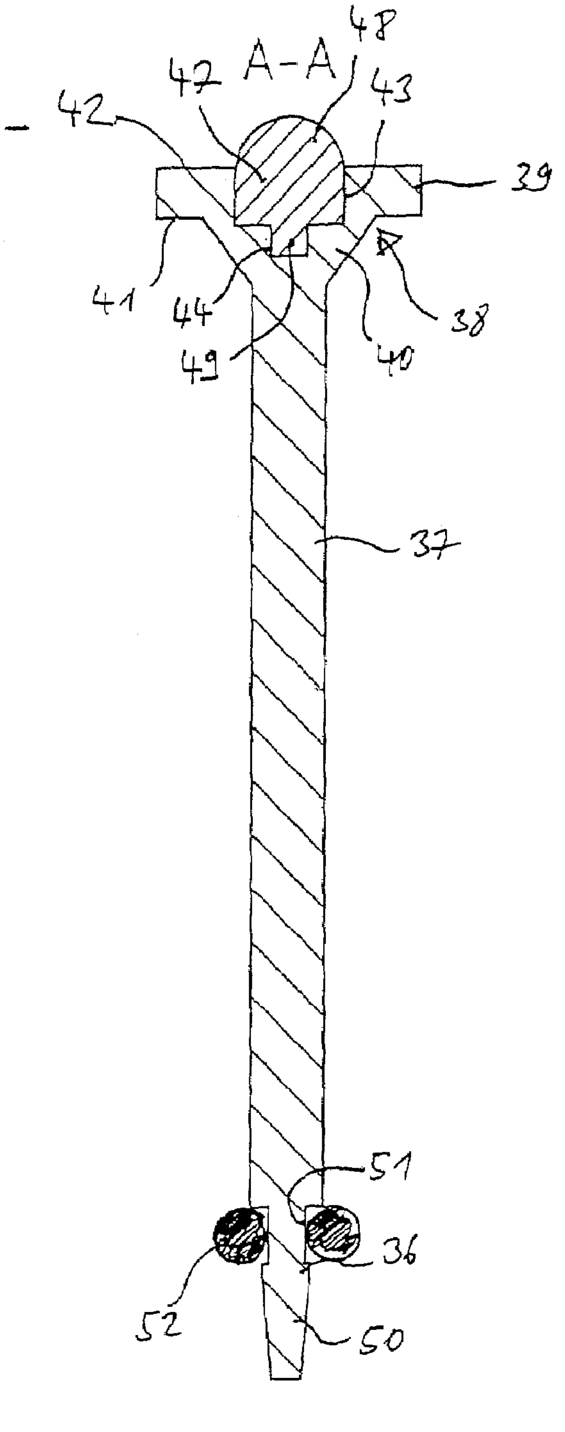
FIG. 3 shows the piston of said multi-channel metering device in longitudinal section.

Each piston head 38 encompasses an annular disc 39 and a tapered portion 40 (see FIGS. 2 and 3) arranged between the annular disc 39 and the piston rod 37.

On the side of the piston rod 37, the piston head 38 has a lower face 41 and a planar upper face 42 on the opposing side.

Proceeding from the upper face 42 the piston comprises a blind hole 43 which has a recess 44 on the base. Said recess has radial widened portions 45, 46 which extend perpendicular to the drawing plane of FIG. 1 as far as the periphery of the tapered portion 40 (see FIG. 2).

A resilient body 47 is arranged in the blind hole 43. The resilient body 47 is cylindrical in the region of the blind hole 43 and spherical in a region projecting beyond the upper face 42. In the example, the region 48 of the resilient body 47 projecting beyond the upper face 42 has the shape of a hemisphere.

The resilient body is anchored below in the piston head 38 by the strip-shaped portion 49 arranged in the recess 44 and the widened portions 45, 46.

The end of the piston 36 opposing the piston head 38 comprises a narrow tapered portion 50, the cone angle thereof corresponding to that of the through-channel 30. A peripheral annular groove 51 is present between the tapered portion 50 and the piston rod 37 which receives a piston seal 52 in the form of a piston sealing ring.

The piston 36 is produced in a two-component injection-moulding method. In this connection, the piston 36 is produced from a hard plastic, for example from a thermoplastic such as Fortron (glass-fibre reinforced polyvinyl sulphide from the Hoechst company). The resilient body 47 is injection-moulded in a second injection cycle from silicone (rubber) or from a thermoplastic elastomer onto the piston 36.

Each piston 36 is arranged with the tapered portion 50 and the piston seal 52 in the cylindrical hollow space 28, even if the piston 36 is withdrawn to a maximum extent from the cylinder 27 (FIG. 1).

Each piston head 38 is located in a receiver 17 coaxial to the cylinder 27. In this connection the piston rod 37 extends through the through-hole 18.

The piston head 38 is positioned in the region of the circular disc 30 with the lower face 41 on the base 19.

Moreover, the spherical region 48 of the resilient body 47 is positioned on the abutment surface 20. The resilient body 47 is slightly elastically compressed in the spherical region 48.

Each piston 36 may be connected by simple insertion of the piston head 38 through the insertion opening 21 into the receiver 17 with the cross-member 14. Due to the elastic compression of the resilient body 47, it is held in a defined position in the receiver 17 and play between the piston head 38 and the receiver 17 is compensated thereby. Conversely, the piston 36 may be disassembled extremely easily.

For pipetting, the pipetting device is connected to a drive device 53. To this end, it is inserted with the fastening device 5 in a fastening receiver 54 of the drive device 53 and by screwing the fastening ring 6 into an internal thread 55 of the fastening receiver 54 connected thereto. In this connection, the fastening device 5 is positioned with its frontal end on the bottom of the fastening receiver 54.

Moreover, the coupling device 10 is connected to a further coupling device 56 of a lineal drive 57 of the drive device 53 adjusted thereto.

By axial displacement of the linear drive 57 the piston actuating rod 9 and the pistons 36 connected thereto may be displaced. In this connection, the pistons 36 displace air columns inside the hollow spaces 28 and the connecting channels 30, in order to eject liquid from and/or to suction liquid into the pipette tips mounted on the seat 29.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Pipetting device for metering liquids comprising a piston actuating rod (9), at least one receiver (17) for a piston head (38) arranged on one end of the piston actuating rod (9) and which is defined by an abutment surface (20) for the piston head (38) in the axial direction of the piston actuating rod (9), and comprises a through-opening (18) for a piston rod (36) opposing said piston head and a base (19) for supporting the piston head (38) surrounding the through-opening (18), at least one cylinder (27) with a hollow space (28), at least one seat (29) for holding a pipette tip, at least one through-channel (30) connecting the hollow space (28) of a cylinder (27) to a through-hole (31) in a seat (29) and at least one piston (36) arranged longitudinally displaceably in the hollow space (28) of a cylinder (27) with a piston rod (37) extending through the through-opening (18) of a receiver (17) and a piston head (38) at the end of the piston rod (37) arranged in the receiver (17), which is positioned on the base (19) with a lower face (41) facing the piston rod (37) and comprises a resilient body (47) projecting beyond an upper face (42) facing away from the piston rod (37), which does not bear against the abutment surface in an elastically compressed manner, or bears against the abutment surface (20) in a partially elastically compressed manner.

2. Pipetting device according to claim 1, which is a single channel pipetting device.

3. Pipetting device according to claim 1, which is a multichannel pipetting device.

4. Pipetting device according to claim 1, in which the piston actuating rod (9) comprises a cross-member (14) aligned transversely to its longitudinal axis with a plurality of receivers (17) for piston heads (38) arranged adjacent to one another and which comprises a plurality of parallel cylinders (27) with a plurality of pistons (36) guided therein and arranged with their piston heads (38) in the receivers (17).

5. Pipetting device according to claim 1, in which the receiver (17) has an insertion opening (21) extending transversely to the piston actuating rod (9) for the piston head (38) and the piston rod (37).

6. Pipetting device according to claim 1, in which the piston head (38) is supported by an annular disc (39) on the base (19).

7. Pipetting device according to claim 1, in which the piston head (38) comprises a tapered portion (40) between an annular disc (39) and piston rod (37).

8. Pipetting device according to claim 1, in which the piston (36) on the upper face (42) of the piston head (38) comprises a blind hole (43), in which the resilient body (47) is partially arranged.

9. Pipetting device according to claim 8, in which the blind hole (43) at a distance from its opening comprises at least one widened portion (45, 46) into which the resilient body (47) engages.

10. Pipetting device according to claim 9, in which the blind hole (43) comprises widened portions (45, 46) diametrically opposing one another.

11. Pipetting device according to claim 9, in which the widened portions (45, 46) extend from a recess (44) at the bottom of the blind hole (43).

12. Pipetting device according to claim 1, in which the resilient body (47) comprises a spherical portion (48) which projects from the piston head (38).

13. Pipetting device according to claim 1, in which the piston (36) has a tapered portion (50) on the end remote from the piston head (38) and the cylinder (27) on the inside and/or the connecting channel (30) has a corresponding taper.

14. Pipetting device according to claim 1, in which the piston (36) comprises at least one peripheral piston seal (52) on the end remote from the piston head (38).

15. Pipetting device according to claim 14, in which the piston seal (52) is a piston sealing ring inserted into an annular groove (51) on the periphery of the piston (36).

16. Pipetting device according to claim 1, in which the resilient body (47) and/or the piston seal (52) comprises an elastomer.

17. Pipetting device according to claim 1, in which the resilient body (47) and/or the piston seal (52) consist/s of silicon and/or of thermoplastic elastomer.

18. Pipetting device according to claim 1, in which the piston (36) is produced from plastic.

19. Pipetting device according to claim 18, in which the piston (36) and the resilient body (47) are produced in a multi-component injection-moulding method.

20. Pipetting device according to claim 1, in which the resilient body (47) is injection-moulded onto the piston (36).

21. Pipetting device according to claim 1, with a housing (22) which encompasses the piston actuating rod (9) and the at least one cylinder (27) with the at least one piston (36) and the at least one seat (29) being accessible from outside on one side of the housing (22).

22. Pipetting device according to claim 1, in which one end of the piston actuating rod (9) is accessible from outside on one side of the housing (22).

23. Pipetting device according to claim 22, in which the piston actuating rod (9) projects from the side of the housing (22).

24. Pipetting device according to claim 1, in which the housing (22) comprises a fastening device (5) for fastening the pipetting device to a drive device (53).

* * * * *